April 4, 1967 — J. R. LEWIS — 3,312,121
CONTROL MEANS
Filed Jan. 27, 1965 — 3 Sheets-Sheet 1

INVENTOR
JOHN R. LEWIS
BY
Kirschstein, Kirschstein & Ottinger
ATTORNEYS

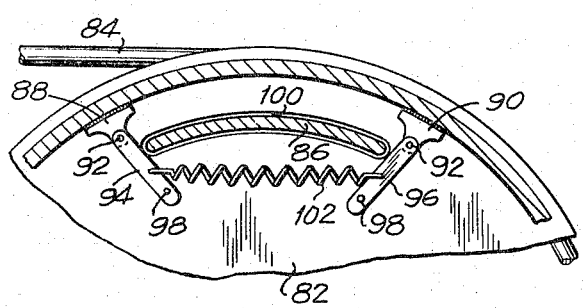
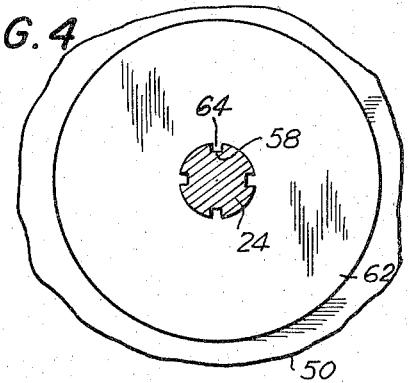
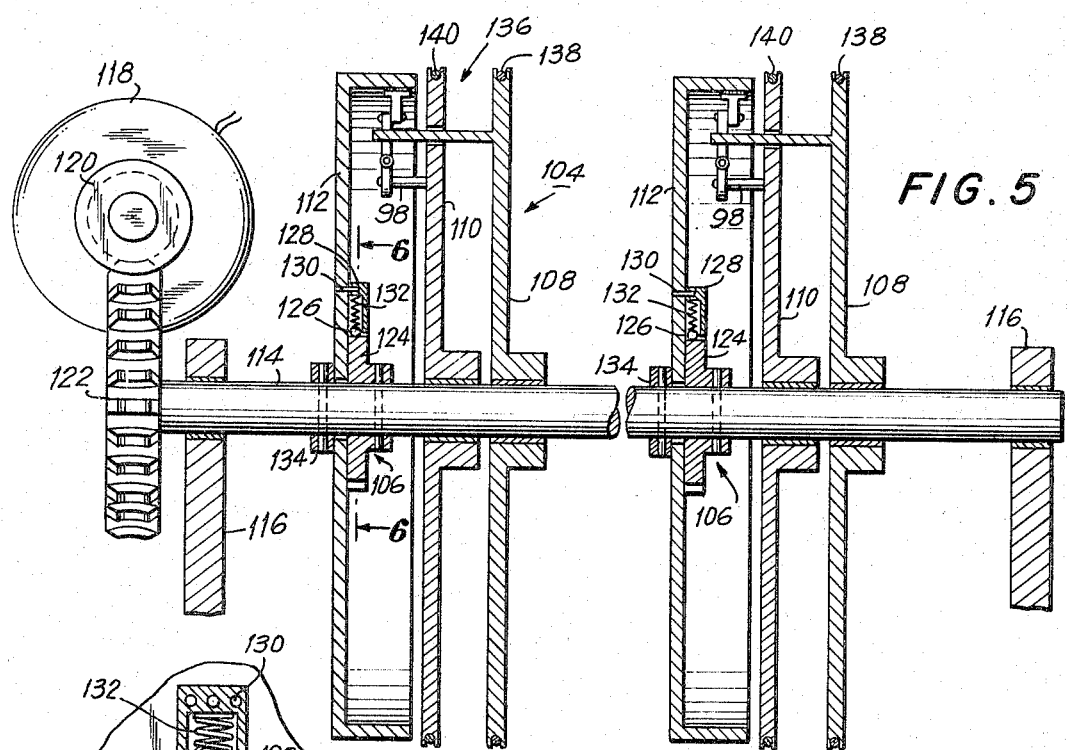
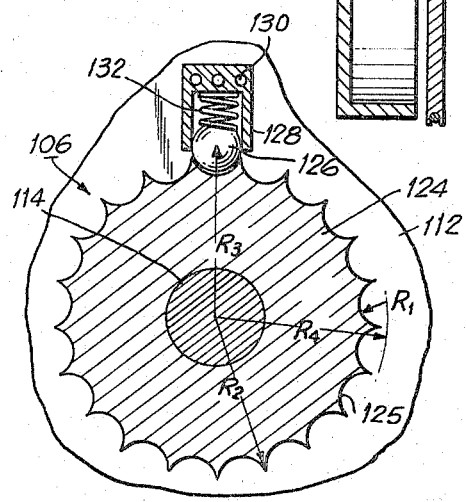

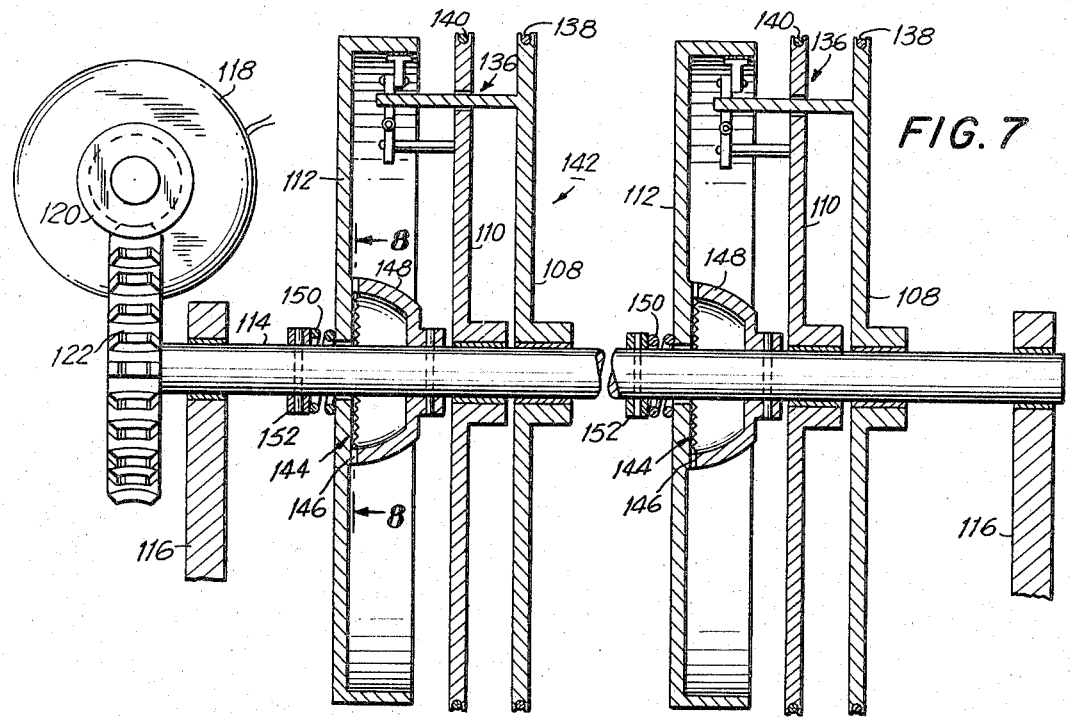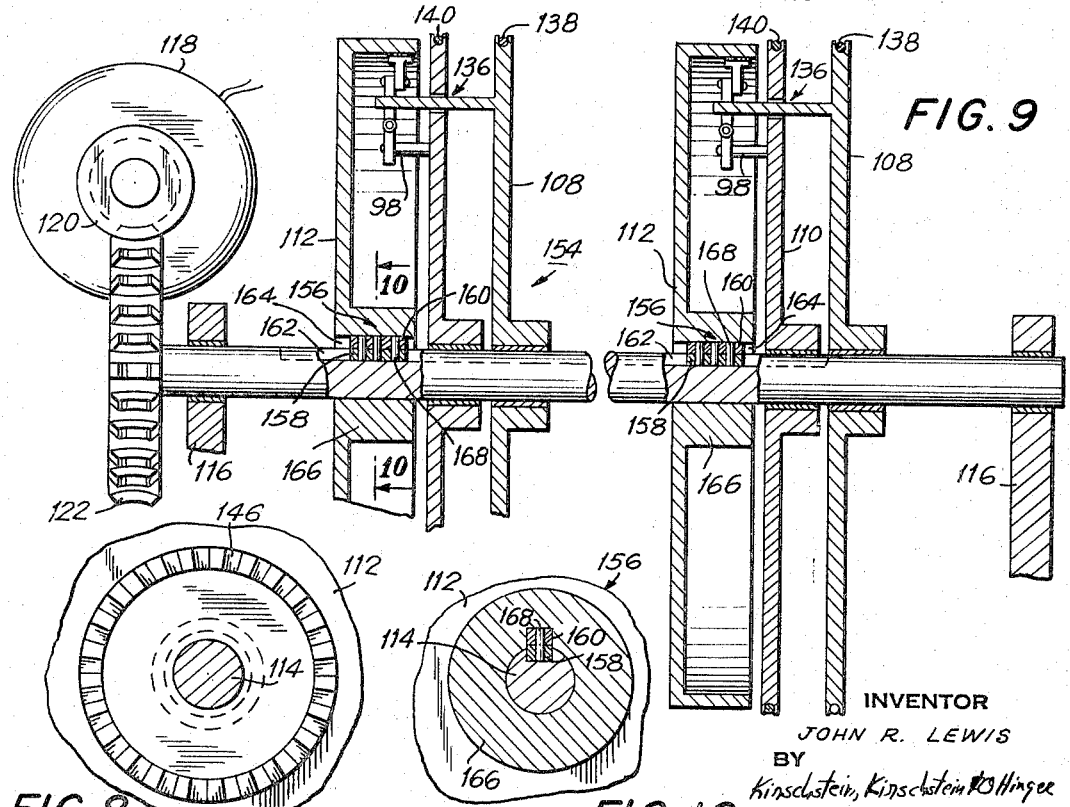

United States Patent Office 3,312,121
Patented Apr. 4, 1967

3,312,121
CONTROL MEANS
John R. Lewis, North White Plains, N.Y., assignor to Safe Flight Instrument Corporation, White Plains, N.Y., a corporation of New York
Filed Jan. 27, 1965, Ser. No. 428,441
7 Claims. (Cl. 74—480)

This invention relates to a control means and, specifically, to a system for controlling several driven elements with a single common (master) secondary control member which is automatically overridable by each of several individual primary control driver elements, each different one of the latter of which is associated with a different one of the driven elements.

There are many situations in the control of existing complex mechanical equipment where plural mechanical elements must be operated individually or simultaneously at will. For example, if a plurality of engines is used to drive a single conveyance, it is desirable upon certain occasions to increase or decrease the power outputs of all of the engines concurrently. Upon other occasions it is desirable to individually increase or decrease the power output of one or more of the group of engines while leaving the remaining engines alone or allowing the remaining engines to be controlled concurrently by automatic equipment such as a servo mechanism. This is particularly the case in multi-engine aircraft where a pilot is required to manually individually adjust the power outputs of the different engines so as to make them carry proper shares of the load and yet wherein servo equipment controls the engines in common (jointly) after their individual adjustment.

A system of the aforesaid character is shown, described and claimed in United States Letters Patent No. 2,881,635 issued April 14, 1959.

In the aforesaid patented system there is a plurality of modules the number of which is equal to the number of elements, e.g., engine throttles, to be driven. Each module is made up of several basic compoents. These include (a) a different one of the driven elements for each module; (b) a different primary control driver element for each module and which conventionally is hand-operated; (c) a different secondary control driver element for each module which conventionally is operated automatically, e.g., by a servo motor, in response to a control signal; (d) a means permanently directly coupling the primary control driver element of each module to the driven element of that module; (e) a disengageable means coupling the driven element of each module to the secondary control driver element of that module; and (f) a means that automatically disengages the aforesaid disengageable means upon operational control movement of the primary control driver element relative to the secondary control driver element, so that for each module the movement of the primary control driver element prevails over the movement of the secondary control driver element insofar as operation of the driven element is concerned. That is to say, the control of the primary control driver element overrides the control of the secondary control driver element in regulating movement of the driven element. Moreover, in the aforesaid patented control system all of the secondary control driver elements are interconnected for common movement, i.e., are jointly moved together, by a single master secondary control member such, for instance, as a servo mechanism, and are held stationary when the master secondary control member is not being moved and none of the primary control driver elements are experiencing operational control movement. The means for holding the plural secondary control driver elements stationary when the master secondary control member is not being turned constitutes a means for holding the master secondary control member stationary. The immobility of the secondary control driver elements is transmitted to the driven elements through the disengageable coupling means. In the preferred form of the invention the means for holding the master secondary control member stationary constitutes a self-locking drive such as a worm and worm gear between a single servo motor that services all of the modules and the said master secondary control member. Alternatively, and as shown in the aforesaid United States Letters Patent, such means may be in the form of a brake which is effective to engage and immobilize the master secondary control member when the common servo motor is idle.

Systems of the foregoing character are prone, or give rise, to certain difficulties, principally as a result of the nature of the apparatuses with which they are affiliated. For example, certain safety devices which now are present in an engine control complex, as for example, a safety device on an engine which automatically closes a throttle due to malfunction in thrust reverser valves, will retard the throttle through the engine control cables to the cockpit. However, since the system shown in the aforesaid Letters Patent is irreversible, such a function is blocked. Indeed, the forces that may be thus exerted in an effort to retard the throttle may be so high as to damage components of the engine or the control cable system. Furthermore, if for some reason the disengageable means that couples the driven element of a module to the secondary control driver element of that module should freeze due, for example, to mechanical malfunctioning, individual engine adjustment and manual throttle control no longer would be possible. Still further, if the throttle linkage system for an engine should freeze and the master secondary control member should attempt to move the associated driven member, the servo motor might damage elements of the system or damage the throttle linkage or itself overheat and burn out.

It is an object of the present invention to provide a system of the character described which is an improvement over the aforesaid system in that it includes an arrangement for limiting undue stresses that might otherwise be built up in the system due to sundry malfunctions, as for example, those of the nature described above.

It is another object of the present invention to provide a system of the character described which incorporates mechanical fuses, so to speak, or in other words, torque limiting means, to hold such undue stresses to a predetermined maximum.

It is another object of the present invention to provide a system of the character described in which each module includes, that is to say, each driven element has associated therewith, a separate such torque limiter means, so that when a malfunction occurs in connection with any particular driven element, the remainder of the driven elements may be properly controlled while the malfunctioning element is bypassed.

It is another object of the invention to provide a system of the character described which accomplishes the foregoing purposes with relatively few and simple extra parts and at a minimal additional cost.

Other objects of the invention in part will be obvious and in part will be pointed out hereinafter.

The invention accordingly consists in the features of construction, combinations of elements and arrangements of parts which will be exemplified in the devices hereinafter described and of which the scope of application will be indicated in the appended claims.

In the accompanying drawings in which are shown various possible embodiments of the invention, FIG. 1 is a fragmentary top plan view of a control system embodying the improvement of the present invention, to wit, a control system having a separate torque limiter means affiliated with each different module;

FIG. 3 is an enlarged sectional view taken substantially along the line 3—3 of FIG. 2 and illustrating a suitable irreversible mechanism used on the control system of the present invention;

FIG. 4 is an enlarged fragmentary sectional view taken substantially along the line 4—4 of FIG. 2;

FIG. 5 is a view similar to FIG. 2 of a control system embodying a modified form of the instant invention;

FIG. 6 is an enlarged fragmentary sectional view taken substantially along the line 6—6 of FIG. 5 and showing an alternate form of torque limiter means which characterizes the second embodiment of the invention;

FIG. 7 is a view similar to FIG. 2 of a control system embodying another modified form of the invention;

FIG. 8 is an enlarged fragmentary sectional view taken substantially along the line 8—8 of FIG. 7 and showing another alternate form of torque limiter means which characterizes the third embodiment of the invention;

FIG. 9 is a view similar to FIG. 2 of a control system embodying still another modified form of the invention; and FIG. 10 is an enlarged fragmentary sectional view taken substantially along the line 10—10 of FIG. 9 and showing still another alternate form of torque limiter means which characterizes the fourth embodiment of the invention.

Figure 1:
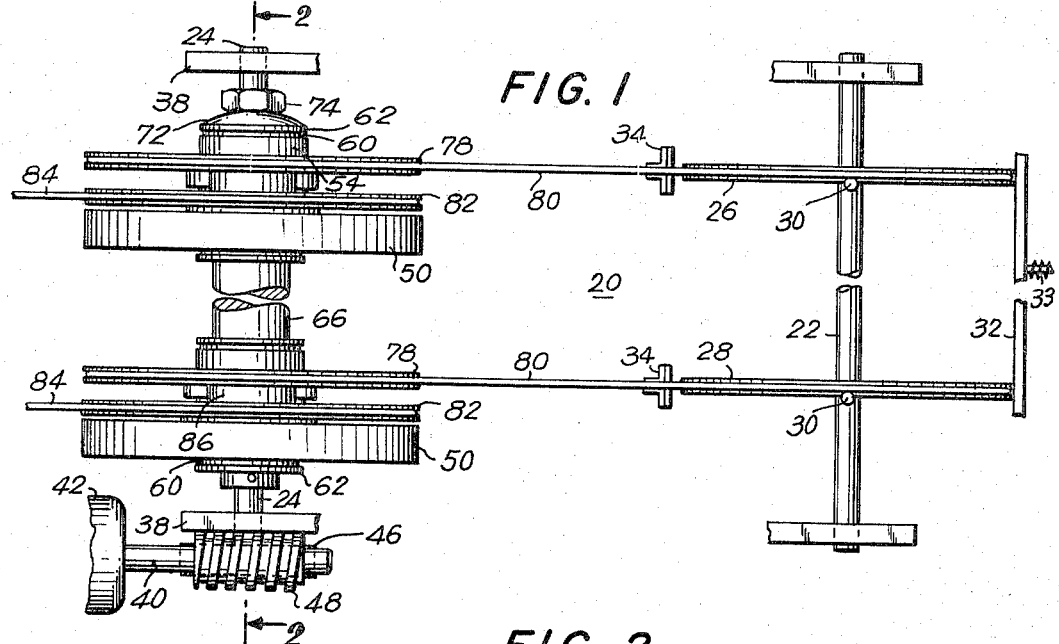

Referring now in detail to the drawings, and, more particularly, to FIGS. 1–4, the reference numeral 20 denotes a control system embodying one form of the invention. Said system includes a primary control shaft 22 and a master secondary control shaft (member) 24 which are spaced from one another. These shafts may be close together, for example, they both may be located in or adjacent the cockpit of an airplane, or, optionally, the shafts can be as far apart as they might be, for instance, if this system were being utilized for controlling plural engines in a submarine or boat. For convenience, I have shown the two shafts as parallel to one another and horizontally disposed, these being the positions in which said shafts conveniently are arranged when the system is employed in a multiple engine aircraft.

The term "primary control shaft" may be misleading in that the shaft 22 does not actually control anything. However, the shaft, which is stationary, has rotatably mounted on it a plurality of primary control driver elements 26, 28. These elements have been conveniently illustrated as sheaves, i.e., pulleys. However, it will be appreciated by skilled workers in this art that the elements 26, 28 may take on other forms or shapes, e.g., arcuate segments or even simple levers. To facilitate manipulation of the primary control driver elements, each of the sheaves desirably has a manually manipulatable lever type handle 30 fixed on the side thereof. In a conventional installation the sheaves will be concealed in a housing having slots through which the handles protrude for convenient operation, the primary control driver elements 26, 28 serving as the driver elements of a simple kinematic train. It also is well to note at this point that each primary control driver element 26, 28 is part of one module of the control system, there being one such module provided for each driven element to be controlled, i.e., for each throttle, so that in a control system for a four-engine aircraft there would be four primary control driver elements and four handles 30. That the two primary control driver elements illustrated are not necessarily all that are present is indicated by a broken away central portion of each shaft 22, 24.

In order to prevent drifting of the handles 30, there is provided a light frictional drag on the sheaves 26, 28, this conveniently taking the form of a bar 32 which rests lightly on the peripheries of all of said sheaves and thus creates a slight frictional restraint which will not prevent the sheaves from turning with comparative freedom, but will deter rotation of these sheaves of their own volition or because of vibration of the aircraft. The amount of frictional restraint is only a few ounces-inches, e.g., three or four ounces-inches, so that it is hardly noticeable and will not prevent the operation of the control system in the manner hereinafter to be described. A spring 33 lightly presses the bar 32 against the sheaves to engender the requisite frictional drag.

Furthermore, the primary control driver elements are individually provided with brakes 34 which can be selectively operated from handles (not shown), so that if under some unusual circumstance it is desired not to move the primary control driver element for any given throttle, the same can be accomplished. This may be the case, for example, where one of the engines has failed and it is desired to hold the throttle for it in idling position.

The master secondary control shaft 24 has its ends journalled in bearings 36 supported by frame members 38. Said shaft 24 is driven by the output shaft 40 of a servo motor 42 having input leads 44. The servo motor is regulated by an automatic throttle pilot, a typical automatic throttle pilot system being shown in United States Letters Patent No. 3,043,540 issued July 10, 1962 for "Airplane Instruments" and assigned to the owner of the present application. The servo motor will turn its output shaft 40 to angular positions corresponding to the desired engine throttle positions which should be assumed for any given set of circumstances.

The output shaft of the servo motor is connected to the master secondary control shaft 24 by a self-locking drive constituting, for example, a worm wheel 46 fast on the master secondary control shaft and a worm 48 fast on the servo motor output shaft 40. The worm meshes with the worm wheel. Quite apparently, this drive is capable only of operating in a manner such as to turn the shaft 24 upon rotation of the shaft 40. Thus, the shaft 24 is locked against rotation except upon turning of the shaft 40.

For each module there is provided a different secondary control driver element 50, all of which are mounted on the master secondary control shaft 24. Each different secondary control driver element 50 is turned by said master secondary control shaft 24 through a separate torque limiter means 52 in such a manner that when the shaft 24 turns, the secondary control driver elements will turn therewith. The torque limiter means transmit power up to a predetermined value of torque for which the limiter means are designed. Above this value the limiter means will permit relative angular movement between the master secondary control shaft 24 and each of the secondary control driver elements 50. Each secondary control driver element 50 includes a different hub 54.

As indicated immediately above, there is a separate torque limiter means 52 for each module. Inasmuch as these torque limiter means are identical with one another, only one will be described and such description will serve for the remainder. A torque limiter means 52 in the control system 20 constituting the first described embodiment of the invention is essentially a friction clutch, there being a separate friction clutch for each module. However, to conserve space and materials, the spring means which conventionally biases the two relatively rotatable members of a friction clutch toward one another is provided in common for all of the separate torque limiter means 52.

Figure 2:
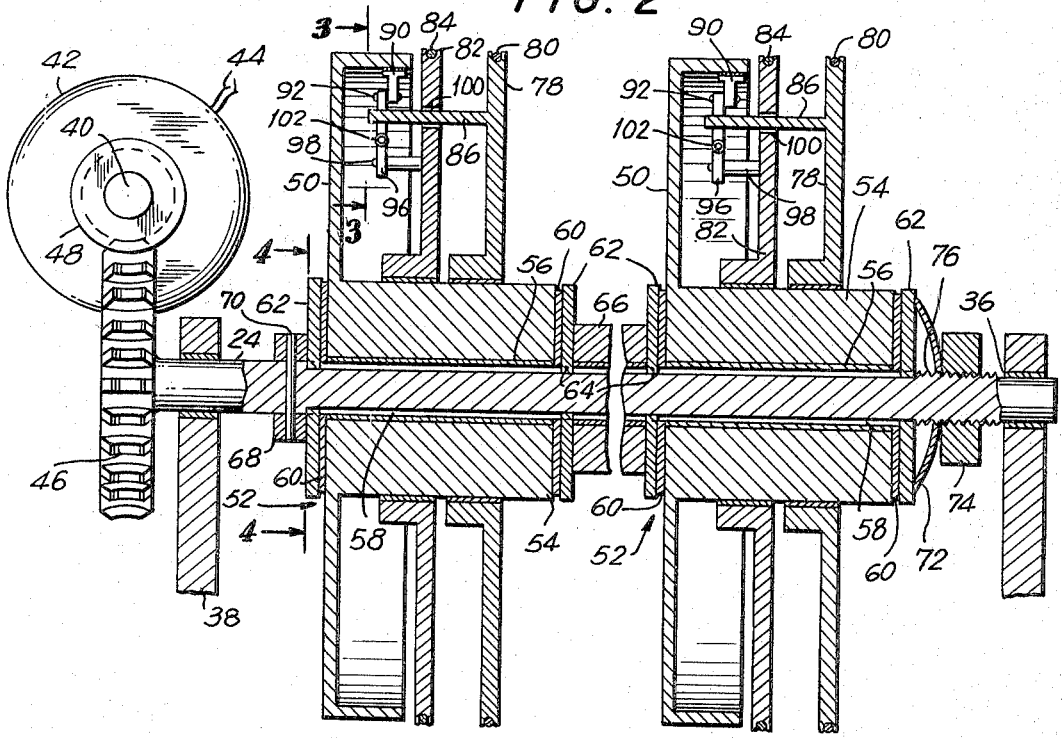
FIG. 2 is a longitudinal sectional view along the master secondary control shaft, the same being taken substantially along the line 2—2 of FIG. 1.

More specifically, the torque limiter means 52 associated with the left-hand module of FIG. 2 in part includes the hub 54. Said hub is provided with a central bushing 56 in which the shaft 24 is journalled to enable the hub to rotate freely with respect to and about the master secondary control shaft 24. For a purpose which soon will be apparent, the master secondary control shaft 24 is formed with longitudinal splines 58, four such splines being shown (see FIG. 4). The bushing 56 bridges the mouths of the splines. At each end of the hub 54 there is provided a friction disc 60 such as is commonly used to face friction clutches. Each said friction disc may be fast to the affiliated end of the hub or it may be free to rotate about the shaft 24 or it may be fast to the affiliated opposed pressure member.

At each end of the hub and spaced therefrom by the friction disc 60 is a different pressure member 62. Each such pressure member may also, if desired, although the same is not necessary, and if the friction discs are secured to the ends of the hub 54, have a friction disc fast on the surface thereof which faces the adjacent end of the hub. The pressure members are longitudinally slidable on the master secondary control shaft 24, but are rotatable therewith, this arrangement being effected by the provision of radially inwardly extending teeth 64 on the pressure members which teeth protrude into the splines 58 and into central openings of such pressure members that are provided to longitudinally slidably receive the shaft 24. Thus, if the pressure members positively turned by the shaft 24 are urged against the ends of the hub, a frictional drive will be provided between each pressure member and the adjacent end of the hub through the friction disc. Hence, rotation of the shaft 24 will turn the hub 54 up to the torque limit determined by the friction capacity of the two friction clutches associated with the hub. For any torque larger than their capacity the friction clutches will slip.

Adjacent pressure members 62 of adjacent modules are spaced from one another by shaft encircling collars 66 the ends of which abut the outer faces of said pressure members.

Resilient means is included to commonly urge all of the pressure members toward the ends of their affiliated hubs 52. For this purpose an abutment ring 68 is secured, as by a pin 70, to the shaft 24 alongside of the outer face of one endmost pressure member 62. On the outer face of the other endmost pressure member 62 a compression spring 72 is located. Such spring may be a helical coil spring, but here is shown as a Belleville spring, to wit, an arched resilient washer. The spring 72 is compressed between the outer face of the aforesaid endmost pressure member 62 and an anchor or ground in the form of a nut 74 which is secured to the shaft 24 so as to turn therewith. A nut is used as an anchor in order to permit the compressive force provided by the spring 72 to be varied and thus the torque limiting value to be adjusted to any desirable value. Said nut meshes with a thread 76 on the end of the shaft opposite from the worm wheel 46. The nut 74 is turned to set the compressive force furnished by the spring 72 to some desirable value which then will be provided at each friction clutch, there being, as above noted, two such clutches for each secondary control driver element 50—one clutch at each end of each hub 54.

It will be apparent that with the foregoing arrangement when the shaft 24 is turned, it will turn each secondary control driver element 50, providing that the torque opposing such rotation of the secondary control driver element is within the limit of the torque transmittable by the clutches associated with that secondary control driver element. It also will be apparent that if a turning force is applied to a secondary control driver element, this force will turn such element when it is in excess of the limiting torque. Up to the limiting torque such force will be ineffective to turn the element due to the holding action of the worm and worm wheel.

For each module there also is provided a sheave 78 which is freely rotatable with respect to the master secondary control shaft 24, specifically by being mounted to turn freely on the hub 54 of the associated secondary control driver element which hub turns with the shaft 24 as long as the torque transmitted by the module is lower than the joint capacity of the two associated torque limiter means. Said sheave 78 is driven by any suitable motion transmitting mechanism from a corresponding sheave 26 or 28 on the primary control shaft 22. For instance, a cable 80 or the like connects each sheave 78 to the corresponding sheave 26 or 28 on the primary control shaft, so that each sheave on the primary control shaft is linked to a different sheave on the secondary control shaft. Thus, the sheaves 78 constitute, in effect, extensions of the primary control driver elements and may themselves be considered to be primary control driver elements.

Each module additionally is provided with a second sheave 82 which likewise is freely rotatable with respect to the master secondary control shaft 24, as by being mounted to turn freely on the hub 54 which latter during normal operation of the system turns with the shaft 24. Each second sheave 82 is adjacent to the sheave 78 for the same module. Each sheave 82 has trained about it a cable 84 or the like which is connected to the driven element of that module, e.g., to a throttle of one of the engines. Any other suitable motion transmitting element may be used in lieu of the cable, e.g., a linkage, servo or hydraulic system. Thus, the sheaves 82 in effect constitute the individual driven elements.

It now will be appreciated that each module has a primary control driver element 78, a driven element 82, and a secondary control driver element 50, the latter being linked through a torque limiter means to a common servo driven master secondary control member which is the shaft 24.

Means is included for turning each driven element 82 upon rotation of the associated secondary control driver element 50, such means being so constructed that if the primary control driver element 78 is actuated (turned or prevented from turning), the primary control driver element automatically will take over control of the driven element, regardless of whether the secondary control driver element is turning or is stationary. More particularly, the secondary control driver element 50 is connected to the driven element 82 by a disengageable means, such for instance, as a coupling which automatically is disengaged upon movement of the primary control driver element 78 relative to the secondary control driver element 50, and the primary control driver element 78 is connected to the driven element 82 by a direct coupling which is rendered effective upon a slight movement of the primary control driver element relative to said driven element. Phrased differently, said couplings are so constructed that positive actuation or holding of the primary control driver element 78 will disengage the first (disengageable) coupling and will render the second (direct) coupling effective.

In the control system being described the aforesaid desired functions are effected by the use in each different module of a different mechanism known as an "irreversible locking control means." Essentially, in this type of means there are provided a driving member which usually is movable under manual control, a driven member which is moved through a slight lost motion coupling by the driving member, and a stationary member. The driven member is clutched to the stationary member in such a manner that if no force is applied to the driving member, the driven member engages the stationary member and therefore is itself held stationary. Accordingly, if any force is applied tending to shift the driven member, i.e., a force other than a force applied by the driving member, the driven member cannot move due to the connection between it and the stationary member. On the other hand, if the driving member is moved, such movement disengages the clutch connecting the driven member to the stationary member so that movement of the driving member causes movement of the driven member. Irreversible locking control means of the foregoing nature are illustrated in United States Letters Patent No. 2,394,384 to Bevan G. Horstmann for a Dual Control System, dated February 5, 1946, and United States Letters Patent No. 2,703,499 to James H. Reid for an Irreversible Locking Control Element, dated March 8, 1955. In addition, a suitable commercial irreversible locking control means of the aforesaid nature is a R-L reverse locking clutch sold by Formsprag Company of Warren (Detroit), Michigan.

In the control system of the instant invention a plurality of irreversible locking control means are employed, a different one for each module. In each module the primary control driver element 78 constitutes the driving member of the irreversible locking control means; the driven element 82 constitutes the driven member of the irreversible locking control means; and the secondary control driving element 50 constitutes the stationary member of the irreversible locking control means, said stationary member being rendered rotatable for the purposes of this invention, and all of the secondary control driver elements 50 being tied together for common rotation by the master secondary control shaft 24, each through a parallel acting pair of torque limiters 52.

For the sake of completeness, one of the irreversible locking control means will now be described in detail, all of said means being identical.

In each module the sheave 78 (the primary control driver element) is formed with an integral tongue 86 that extends in a direction parallel to the shaft 24 toward the secondary control element 50. The secondary control element 50 is in the form of a hollow drum in one piece with the hub 54, said drum having one open side that faces the sheave 78 and through which open side the tongue 86 extends. The sheave 82 which constitutes the driven element is located between the sheave 78 and the open side of the drum 50. Said sheave 82 is connected to the drum 50 for rotation therewith by a friction clutch including a pair of brake shoes 88, 90 (see FIG. 3). Each of these shoes is pivoted, as at 92, to a different toggle arm 94, 96 extending in a generally radially inward direction from the shoe. The inner ends of the toggle arms are pivoted on pins 98 carried by the sheave 82. The arms are located on opposite sides of an arcuate slot 100 through which the tongue 86 freely extends, the side edges of the tongue being located immediately adjacent the sides of the two toggle arms with a slight clearance between the tongue and the toggle arms. A helical spring 102 urges the toggle arms toward one another. The lengths of the toggle arms and the radial dimensions of the shoes are such that the spring jams the shoes against the interior periphery of the drum 50. In other words, the radial distance from each pivot pin 98 to the interior of the brake drum is slightly less than the combined distance from the pin 98 to the pivotal connection 92 between the toggle arm and the brake and the radial distance from said pivotal connection 92 to the drum engaging surface of the shoe. Moreover, each pivotal connection 92 is on the side opposite from the spring of the shortest, i.e., radial, distance from the associated pin 98 to the interior periphery of the drum. Accordingly, as the spring urges the two toggle arms toward one another it increases the combined effective length of each arm and shoe and thereby jams the brake shoes against the interior surface of the drum so as to frictionally interengage the sheave 82 and the drum 50 for common rotation. Hence, with the brake shoes in their foregoing condition, if the drum 50 is turned, it will turn the sheave 82 with it as long as the sheave 78 is not turned relative to the drum 50 and the sheave 82.

However, if the sheave 78 is turned relative to the drum 50 and sheave 82, the tongue 86 will press against one or the other of the toggle arms 94, 96 depending upon the direction of relative rotation. If, for example, the sheave 78 is turned in a clockwise direction, as viewed in FIG. 3, the tongue 86 will press against the toggle arm 96 and will release the frictional engagement between the brake shoe 90 and the drum 50. This is the shoe that locks the sheave 82 to the drum 50 for common rotation in a clockwise direction as viewed in FIG. 3. Thus, release of the brake shoe 90 will permit the sheave 82 to turn relative to the drum 50 when the tongue 86 presses against an end of the slot 100 after shifting the engaged toggle arm. The shoe 88 does not prevent this rotation, since the direction of movement is such as to lessen the frictional engagement between it and the drum 50. Therefore, when the sheave 78 is turned in either direction, it will turn the sheave 82 with it, even though at such time the drum 50 is stationary.

To summarize, if the drum 50 is stationary and the sheave 78 is not moved, the sheave 82 will be unable to turn independently of the sheaves 78, 82 which will be a brake 34 and the drum 50 is turned, said drum will turn independently of the sheaves 78, 82 which will be maintained in a common angular relationship while the friction clutch constituted by the shoes 88, 90 and the drum 50 slips. If the sheave 78 is turned it will turn the sheave 82 regardless of movement or non-movement of the drum 50. If the drum 50 is turned and the sheave 78 is not held by hand, the drum 50 will turn the sheaves 78, 82, the motion from the drum to the sheave 78 being transmitted by pressure of one or the other of the toggle arms 96, 98 against the tongue 86 which is not sufficiently restrained by the drag bar 32 to move the toggle and arm against the pressure exerted by the spring 102.

It will be recalled that when the servo motor 42 is not turning, the master secondary control shaft is held stationary by the worm 48 and the worm wheel 46. Thus, the shaft 24 up to the preset value of the torque limiter means 52 acts as a ground or anchor for the drums 50 and the sheaves 82 whereby to prevent the sheaves 82 from turning when a retrograde force is exerted on the throttle cables 84.

It further will be apparent that the torque limiter means act as safety devices to prevent damage to the control system 20 or to any of the equipment associated therewith if the forces sought to be transmitted through the system 20 in any direction are excessive. Thus, if a force is applied to an engine throttle other than through the cable 84 and as a result the cable 84 attempts to turn the affiliated drum 50, no movement can occur up to the combined preset values of the pair of associated torque limiter means, but if this retrograde force becomes excessive, the torque limiter means 52 will slip before either the throttle system, the cables, or the control system 20 are damaged.

Likewise, if an irreversible locking control means should freeze so that a drum 50 is locked to a sheave 82, a pilot still will be able to operate the engine throttles by manipulating the handles 30. An additional effort will have to be exerted by the pilot to cause the torque limiter means to slip, but this effort is within the capability of the pilot.

Moreover, if a throttle linkage system connected to a cable 84 should freeze and the servo motor attempts, but is unable, to turn the associated driven member 82, the servo motor will not overheat or burn out, nor will the entire system be locked inasmuch as the torque limiter means 52 in the module connected to that driven member can slip so as to allow the secondary control shaft 24 to turn with respect to the affiliated secondary control driver element 50 and to turn the remaining elements 50.

Accordingly, pursuant to this invention, the basic control system shown in United States Letters Patent No. 2,881,635 has been modified to allow it to carry out its normal functions and yet to enable it to cope with unusual circumstances which otherwise might damage or destroy parts of the airplane throttle system.

The nut 74 is adjusted to provide a suitable torque transmitting upper limit for the pairs of torque limiter means affiliated with the modules. The range of acceptable upper torque limits is quite broad. For example, good results are obtained when the combined torque transmitting value of the pair of torque limiter means associated with a module is from about two to about ten times the operating force adapted to be applied to a handle 30 to move a throttle by hand. Characteristically, the upper torque limit value for a pair of torque limiter means associated with a single module is from about fifteen to about sixty pound feet. A typical torque manually applied to a handle 30 usually does not exceed seven pound feet (one half the lower torque limit of fifteen pound feet) while sixty pound feet will not damage any part of the airplane throttle system and is an effort which can be exerted by a pilot. Preferably, all of the torque limiter means have the same upper torque limits.

In the preferred form of the invention a torque limiter means is so constructed that after it has permitted relative motion between the master secondary control shaft and any individual secondary control driver element 50 at torque levels above the upper limit, these two elements will immediately drivingly re-engage when the applied torque drops below the upper limit, and after the re-engagement takes place there will be no further significant relative movement (lost motion) between said elements at torque levels below the upper limit. If there is any lost motion after the applied torque falls below the upper limit, it desirably does not exceed 1°. Phrased differently, the master secondary control shaft and a secondary control driver element should be coupled by a torque limiter means so constructed that the master secondary control shaft is able to drive such secondary control driving element with little or no lost motion as soon as the elements are re-engaged after the excess torque which causes slip of the torque limiter means is removed. With the specific torque limiter means 52 described in relation to FIGS. 1–4, there is no noticeable lost motion of the foregoing character.

The operation of the system 20 when no excess torque is applied is as described in said United States Letters Patent No. 2,881,635.

It should be understood that the present invention is not limited to any particular form of torque limiter means for independently interconnecting each of the secondary driver elements 50 to the master secondary control shaft 24. That is to say, the specific type of torque limiter means described in connection with the control system 20 which, essentially, is a plate friction clutch, can be replaced by any other well known type of torque limiter means. In the following three embodiments of modified systems incorporating the present invention, alternate types of torque limiter means have been illustrated by way of example, these constituting, in sequence, a ball and star wheel type of torque limiter means, an opposed face ratchet type of torque limiter means, and a shear pin type of torque limiter coupling, all of these, except the last, being characterized by their ability to become effective to transmit torque, when the torque drops below its high limit value, with no appreciable further relative angular movement of the driving and driven elements of the torque limiter means.

More specifically, in FIGS. 5 and 6, there is illustrated a control system 104 which is essentially the same as the control system 20 except for the utilization of a ball and star wheel type of torque limiter means 106 in lieu of the plate friction clutch type of torque limiter means 52.

The control system 104 includes several modules—one for each driven element. Each module comprises a sheave 108 which is the primary control driver element, a sheave 110 which is the driven element, and a drum 112 which is the secondary control driver element. A master secondary control shaft 114 is rotatably supported in a pair of frame members 116 and is driven by a servo motor 118 through a worm 120 and worm wheel 122, all of this having been described in detail with respect to FIGS. 1–4. The sheaves 108, 110 are rotatably mounted directly on the master secondary control shaft 114. Each drum 112 likewise is mounted on the shaft 114 and is driven from the shaft through its own associated torque limiter means 106, there thus being separate, but similar, torque limiter means for each drum.

Each said torque limiter means 106 constitutes a star wheel 124 which is pinned to the shaft 114 so as to turn in unison therewith. The periphery of the star wheel is formed into a series of circular segmental indentations 125 of identical size and shape each slightly less than a semicircle. The star wheel 124 constitutes the driving member of the torque limiter means 106.

The driven member of the torque limiter means 106 is in the form of a spring-loaded ball 126. Said ball is received in a driven cup 128 which is held, as by pins 130, fast to the drum 112. The open mouth of the cup faces radially inwardly toward the shaft 114. The ball can slide axially of the cup in which it is a diametrically snug fit. A helical compression spring 132 contained within the cup 128 biases the ball 126 into driven engagement with the star wheel 124.

The radius $R_1$ of curvature of the indentations is less than the radius of the ball 126 so that the ball will seat firmly in any indentation in order to prevent appreciable lost motion after the applied torque drops below the upper limit and the ball and wheel have drivingly re-engaged. For the same reason the cusps between the indentations are very narrow. The radius $R_2$ of the star wheel at the cusps is slightly less than the distance $R_3$ from the center of the shaft to the center of the ball 126 when the latter is fully seated in an indentation 125, thereby assuring firm engagement between the ball and a star wheel indentation. Moreover, to the same end the radius $R_4$ from the center of the shaft 114 to the circular locus of the centers of curvature of the indentations 125 is greater than the radius $R_2$ and less than the radius $R_3$.

To prevent the drum 112 from shifting axially of the shaft 114, one face of the star wheel 124 slidably rotatably engages one face of the drum 112. Slidably rotatably abutting against the opposite face of the drum is a retaining collar 134 that is pinned to the shaft 114. Thereby, except for the torque limiter means 106, the drum 112 can turn freely with respect to the shaft 114.

The upper torque limit that can be transmitted by the torque limiter means 106 is determined by the strength of the spring 132. The ball tends to be driven back into the cup by the rotation of the star wheel. When the force engendered by the applied torque is great enough the ball will be driven back into the cup far enough to permit the torque limiting means to slip as the ball skips from indentation to indentation.

Each module further includes an irreversible locking control means 136 which, as illustrated, is the same as the means described in detail with respect to the system 20. Cables 138, 140, respectively, similar to the cables 80, 84 of the system 20, connect the sheaves 108, 110 to components such as already have been described in detail with respect to FIGS. 1–4.

The system 104 operates in the same manner as the system 20 and hence will not be redescribed.

It will be appreciated that the torque limited means 106 of the system 104 will immediately re-engage when the applied torque drops below the upper limit and that there is no lost motion subsequent to re-engagement so long as the applied torque remains below the upper limit.

In FIGS. 7 and 8 there is illustrated a control system 142 which is identical to the control system 104 save for the use of a torque limiter means 144 of a different type for each of the modules. Accordingly, the parts of the system 142 have not been redescribed, except for the torque limiter means and have had applied thereto reference numerals that are the same as those used for the corresponding parts of the system 104.

Each module of the control system 142 has its own individual torque limiter means 144. Each such torque limiter means constitutes a face ratchet 146 comprising a ring of V-shaped teeth formed integrally with or secured to the inner face of the drum 112, the ring of teeth being concentric with the shaft 114. This ring of teeth constitutes the driven member of the torque limiter means 144.

The driving member of the torque limiter means 144 is in the form of a cup-shaped ratchet wheel 148 provided with a ring of face teeth on the rim thereof, which ring of teeth matches the ring of teeth on the face ratchet 146 and is registered with and opposed to the teeth of the face ratchet 146. The ratchet wheel 148 is made fast to the shaft 114 as by pinning.

The drum 112 is mounted on the shaft 114 for rotation relative thereto, except for the action of the torque limiter means 144, and also to permit longitudinal movement axially of such shaft. Means such as a compression spring 150 encircling the shaft 114 biases the drum 112, and hence the ring of teeth in the face ratchet 116, toward the ratchet wheel 148. Such spring 150 is held under compression between the outer face of the drum 112 and a retaining collar 152 pinned to the shaft 114.

In the operation of the system 142 it will be apparent that the torque limiter means 144 will slip so as to permit the rings of teeth to rotate relative to one another when the torque applied through the torque limiter means is in excess of a predetermined value which value will enable the driving ring of teeth to cam itself on the driven ring of teeth to an extent such that the spring 150 is compressed sufficiently to allow the tips of the teeth to ride over one another. Immediately the applied torque drops below the upper limit for the torque limiter means the rings of teeth will re-engage and there will be no lost motion as long as the applied torque remains below the upper limit. In all other respects the operation of the system 142 is identical to that of the systems 20 and 104.

In FIGS. 9 and 10 there is illustrated a control system 154 which is the same as the systems 104 and 142 shown and described with respect to FIGS. 5, 6 and 7, 8, respectively, except for another type of torque limiter means 156, a separate one of which is associated with each module. Hence, all of the parts of the system 154 save for such torque limiter means, have not been redescribed and have had applied thereto the same reference numerals as were employed in connection with the systems 104 and 142.

Each torque limiter means 156 includes a driving key 158 and a driven key 160. The key 158 is caught in a spline 162 running longitudinally of the shaft 114; the key 160 is caught in a spline 164 running longitudinally of the bore of the hub 166 of the drum 112. Except for the torque limiter means 156, the drum is free to turn with respect to the shaft 114. The two keys are interconnected for common rotation by one or a few, e.g., three, shear pins 168 extending from drive fits in openings in the key 158 into drive fits in openings in the key 160 and thereby bridging the interface between said keys. Such shear pins are conventional and available in a wide variety of diameters and materials. The pins 168 are so selected as to material and diameters as to provide the desired upper torque limiting value that can be transmitted by each of the torque limiting means 156. When this value is exceeded, the pins will shear and there no longer will be an operative connection between the shaft 114 and the drum 112 affiliated with overloaded torque limiting means. It will be apparent that this type of torque limiter means cannot establish re-engagement between the driving and driven elements and when it is overloaded it merely acts as a mechanical fuse rather than, by analogy, as an automatically resettable mechanical circuit breaker. That is to say, to re-establish the operational facilities of such a torque limiter means 156, once it has been overloaded, the control system must be taken apart to permit the keys 158, 160 to be driven out of their splines, rejoined with fresh shear pins, and reinserted in their splines.

It thus will be seen that there are provided devices which achieve the several objects of this invention and which are well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A control system for a plurality of driven elements, said system including a plurality of modules, each module comprising a different one of said driven elements, a primary control driver element, a secondary control driver element, disengageable means coupling the driven element to the secondary control driver element, means permanently directly coupling the primary control driver element to the driven element, and means automatically disengaging the first-named coupling upon the operational control movement of the primary control driver element relative to the secondary control driver element, said system further including a master secondary control member, and, for each module, a separate torque limiter means interconnecting the master secondary control member to the secondary control driver element for that module, the upper torque limit values of all the torque limiter means being substantially equal to one another and being from about two to about ten times the operating torque adapted to be applied to a primary control driver element, and means for moving the master secondary control member and for holding the master secondary control member stationary when the moving means therefor is idle.

2. A control system as set forth in claim 1 wherein the torque limiter means are plate friction clutches.

3. A control system as set forth in claim 1 wherein the torque limiter means are opposed face ring toothed members including means to urge said toothed members toward one another.

4. A control system as set forth in claim 1 wherein the torque limiter means are ball and star wheel clutches.

5. A control system as set forth in claim 1 wherein the means for moving the master secondary control member includes a servo motor.

6. A control system as set forth in claim 1 wherein the torque limiter means each includes two relatively rotatable members and means operable below an upper torque limit to interengage said members to one another for common rotation with a lost motion not exceeding 1°.

7. A control system as set forth in claim 1 wherein the torque limiter means each includes two relatively rotatable members and means operable below an upper torque limit to mutually engage said members to one another for common rotation without significant relative rotary movement.

References Cited by the Examiner

UNITED STATES PATENTS

| | | | |
|---|---|---|---|
| 1,237,932 | 8/1917 | Marlin | 64—29 |
| 1,611,940 | 12/1926 | Ohmer | 64—29 |
| 2,771,789 | 11/1956 | Rossmann et al. | 74—625 |
| 2,881,635 | 4/1959 | Greene | 74—480 |
| 3,071,945 | 1/1963 | Shomo | 64—28 |

MILTON KAUFMAN, *Primary Examiner.*